(No Model.)

W. G. MARTIN.
CULTIVATOR.

No. 313,355. Patented Mar. 3, 1885.

Attest
J. Paul Mayer

Inventor
William G. Martin
By Thos. S. Sprague
Atty

UNITED STATES PATENT OFFICE.

WILLIAM G. MARTIN, OF YPSILANTI, MICHIGAN.

CULTIVATOR.

SPECIFICATION forming part of Letters Patent No. 313,355, dated March 3, 1885.

Application filed May 15, 1884. (No model.)

*To all whom it may concern:*

Be it known that I, WILLIAM G. MARTIN, of Ypsilanti, in the county of Washtenaw and State of Michigan, have invented new and useful Improvements in Cultivators; and I do hereby declare that the following is a full, clear, and exact description thereof, reference being had to the accompanying drawings, which form a part of this specification.

This invention relates to certain new and useful improvements in the construction of garden-cultivators; and the invention consists in the peculiar construction, arrangement, and combination of parts, all as more fully hereinafter set forth and claimed.

Figure 1:
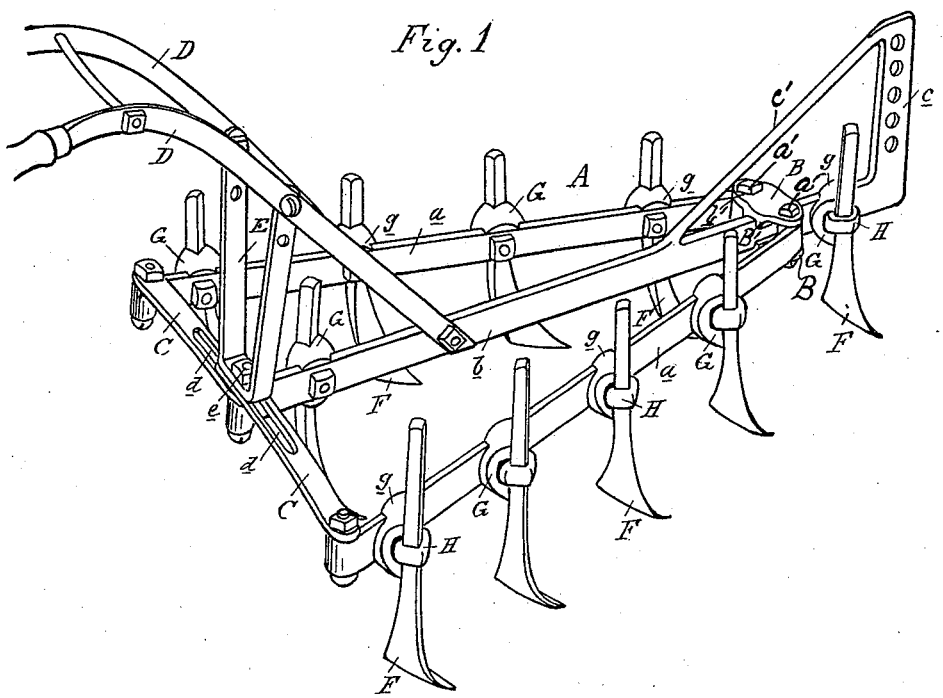
Figure 2:
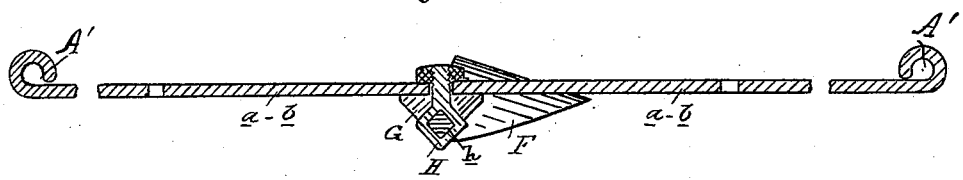

Figure 1 is a perspective of my improved device. Fig. 2 is a sectional detail of devices employed for securing the teeth.

In the accompanying drawings, which form a part of this specification, A represents my cultivator-frame, consisting of the two side bars, $a$, and the central bar, $b$, the latter being the longer and terminating at its forward end in a clevis-head, $c$, to which the draft force is applied.

B is a head having depending flanges B′ and ears $b'$. One of these heads is placed above and another below the intersecting ends of the central bar, and the side bars and bolts $a'$, passing through these ears and the loops in the ends of the side bars, secure the parts together, and the bolts $a'$ form pivots on which the side bars are free to turn. These side bars terminate at each end in loops A′, and the rear ends have pivotally secured to them the spreader-bars C, the overlapping ends of which are slotted, as at $d$, to engage with a bolt, $e$, projecting upward from the rear end of the central bar, $b$.

D represents handles, the forward ends of the bars of which are secured to the central bar, $b$, and are supported upon a U-shaped riser, E, the foot of which rests upon the overlapping ends of the spreader-bars C, and is secured by the bolt and nut $e$, which serve to secure the overlapping ends of the spreader-bars as well.

F represents the cultivator-teeth, two of which are secured to the center bar, $b$, of the frame—one near the front end and one near the rear end—with their points in opposite directions, while to the outside or outer faces of the bars $a$ of the frame similar cultivator-teeth, F, are secured, as shown. These teeth are secured to their positions by means of a clamp-plate, G, which has two flanges, $g$, which embrace the edges of the bars, while in their outer faces there is a vertical recess formed corresponding to the shape of the tang of the cultivator-teeth, which pass through an eye-bolt, H, the threaded end of which passes through the center of the clamp-plates G, and the bars receive a nut upon their inner ends, by means of which the cultivator-teeth are rigidly secured to their positions. From this construction it will be seen that the frame can be expanded or contracted readily, so as to cultivate various widths. The teeth are adjustable, and can readily be set to any depth.

It will be noticed that the facial recess in the plate G is V-shaped, and also that the side of the eyebolt adjacent to the plate is of a corresponding shape. This I consider of great importance, as, the tang of the tooth designed to come in contact with the recess in the face of the plate G being correspondingly V-shaped, when the tooth is secured in place, the tang acts in the manner of a wedge, and the tooth is held securely against vertical displacement, while at the same time lateral displacement is effectually prevented, owing to the irregular shape in cross-section of the tang of the tooth, the eye $h$ in the bolt and the recess in the plate coinciding with such irregularity.

I am aware that cultivator-teeth have been secured in place by means of flanged plates having a facial recess and an eyebolt; but in all such cases the tang of the tooth has been circular in cross-section, and consequently susceptible of vertical and lateral displacement, which my construction renders less liable and entirely obviates.

I am also aware of the Patent No. 292,091, and make no claim to the construction shown therein as forming a part of my invention.

What I claim as my invention is—

A cultivator consisting of the central bar, $b$, terminating at one end in a clevis-head, $c$, provided with the brace $c'$, the side bars, $a$, provided with a loop at each end, the heads B and the bolts $a'$, securing the bars $a$ and $b$ together between the clevis-head and the junction of the brace with the bar $b$, the handles D, slotted spreader-bars C, U-shaped riser E, the bolt $e$ securing said bars $b$ and C and riser E together, and the teeth F, secured to said bars $a$ and $b$, one of said teeth being between the clevis-head and the heads B, all the parts being combined, arranged, and operating substantially as described.

WILLIAM G. MARTIN.

Witnesses:
FRANK JOSLYN,
D. C. GRIFFEN.